E. R. WESTON.

BURNISHING APPARATUS FOR PHOTOGRAPHS.

No. 6,885. Reissued Jan. 25, 1876.

WITNESSES

J. L. Coombs

T. M. Coombs

By

INVENTOR

Emile R. Weston,

By J. J. Coombs,

Attorney

N. PETERS, PHOTO-LITHOGRAPHER, WASHINGTON, D. C.

UNITED STATES PATENT OFFICE.

EMILE R. WESTON, OF BANGOR, MAINE, ASSIGNOR TO JOSEPH P. BASS.

IMPROVEMENT IN BURNISHING APPARATUS FOR PHOTOGRAPHS.

Specification forming part of Letters Patent No. 131,320, dated September 10, 1872; reissue No. 5,780, dated March 3, 1874; reissue No. 6,885, dated January 25, 1876; application filed December 2, 1875.

*To all whom it may concern:*

Be it known that I, EMILE R. WESTON, formerly of East Corinth, now of Bangor, in the county of Penobscot and State of Maine, have invented certain new and useful Improvements in Machines for Burnishing Photographs; and I do hereby declare that the following is a full, clear, and exact description thereof, that will enable others skilled in the art to which it appertains to make and use the same, reference being had to the accompanying drawings and to the letters of reference marked thereon which form a part of this specification, in which—

Figure 1:
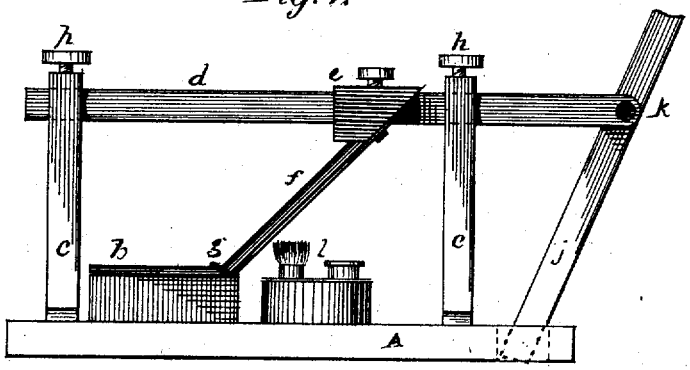
Figure 2:
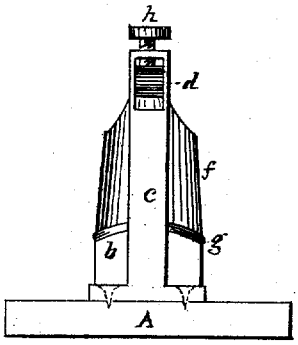

Figure 1 shows a side elevation, and Fig. 2 an end view, of a machine embracing my said invention.

The same letters refer to the same parts in both figures.

The object of my invention is to produce a machine which shall impart to photographic pictures a hard polished surface, which adds both to the brilliancy and durability of the picture, and renders the same less liable to soil than an ordinary photograph.

Photographs have heretofore been finished either by pressure, with or without friction, or by the application of varnish. Pressure without friction cannot produce the smooth, glossy, and brilliant effect that is produced by hot-burnishing, nor will pressure and friction without heat produce such effect, and varnishing not only tends to deaden the tone of the picture, but the varnish is liable to crack, and thus injure the appearance of the picture.

My invention acts on a different principle, and polishes the surface of the picture itself, laying the fibers of the paper down, and burnishing them by friction, under heat and pressure, giving to the picture, when completed, a hard and brilliant burnish-finish.

The surface of the albumen paper usually employed for photographs is shiny without being smooth. It consists of numerous little hills and valleys, reflecting the light in every direction.

By my machine a close, polished, and ungranulated surface is given to the picture, and that peculiar brilliant transparent effect that a print possesses in the water before it has been dried.

This last is due to the action of heat upon the chemicals, its effect being to tone the picture, and to give a luminous quality to the shadows, bringing out the details, and correcting the bronze appearance so frequently seen.

No amount of cold-burnishing will produce this effect, nor will heat and pressure without friction produce it.

One of the principal features of my invention is a concave burnishing-tool working upon a convex bed. This form leaves the picture smoothly and evenly attached to the card.

Another very important feature is a broad metal plate, connected with or forming a part of the burnishing-tool, adapted and arranged to receive the flame of a lamp or gas jet, and conduct the heat thereof to the face of the burnishing-tool.

I will now proceed to describe my machine by reference to the drawing.

A shows the bed-piece on which the working machinery is mounted, and which may be attached to a bench or table by means of screws or clamps.

At *b* is seen the convex bed, of some hard material, upon which the photograph is placed, face upward.

*c c* are standards, having slots at the top, through which passes a bar, *d*, to which, at *e*, is securely fastened the metal plate *f*, carrying the burnishing-tool proper, shown at *g*.

This burnishing-tool I prefer to have of hard cast-iron, and it is most convenient and economical to cast the plate *f* and said burnishing-tool all in one piece, turning up the lower edge, as shown at *g*, which constitutes the burnishing-surface. This burnishing-surface must be made to fit the bed *b*, and be highly polished.

At *h b'* are set-screws, fixed in the top of the standards *c c*, so that by turning them down they press upon the bar *d*, and force it and the attached burnisher down upon the picture and the bed *b*.

*j* is a lever, to operate the burnisher, having its fulcrum in a slot in the bed-piece A, and being pivoted to the bar *d* at K. At *l* is a lamp or gas-jet, by the flame of which the burnisher is heated.

Without friction, under pressure and heat, no practically good burnishing of a photographic picture can be done, and to do the best work the burnisher should be heated considerably above the temperature of boiling water or common steam, so as to soften the albumen of the paper, and thus cause the little hills or protuberances, before mentioned, to be leveled down, and a smooth surface imparted. In no way can the desirable degree of heat be conveniently imparted to the burnishing-tool except by the flame of a lamp or gas-jet. Hence I consider the heating-plate *f* connected with, or forming a part of, the burnishing-tool, and adapted and arranged to receive the flame of a lamp or gas-jet, and conduct the heat thereof to the burnishing-surface—a very important part of my invention.

For burnishing albumen paper, the burnisher requires a more highly or smoothly polished surface than for burnishing common paper or card-board, as the albumen softens by heat, and is liable to adhere to the burnisher; so, also, particles of gum and starch left on the edges of the card-mounts and surface of the print by careless mounting are liable to adhere to the surface of the burnisher, and to produce lines and scratches on the photograph in the process of burnishing.

Cast-iron of a fine hard quality, and highly polished, being less adhesive than any other metal or material suitable for a burnisher of which I am aware, obviates these difficulties in a great degree. Furthermore, when the burnisher, as in my machine, is non-rotating, and presents but a narrow and unchanging line of pressure to the face of the card, it is very important that said burnisher be made of metal which will withstand much friction with little wear. Cast-iron will not soften from heating. Consequently a cast-iron burnisher will retain its hard polished surface, notwithstanding the frequent heating to which it is subjected, and will not be liable to become scratched from the hard or gritty foreign particles that are apt to be in the albumen or on the edges of the card-mount.

In making my invention, I experimented with other metals and materials, and found cast-iron, for the reasons above stated, far preferable to any other metal or material; and I believe I was the first to discover the peculiar fitness of cast-iron, and its superiority to any other metal, for a non-rotating photograph-burnisher to be heated, and presenting but a narrow and unchanging line of pressure to the face of the card.

The operation of burnishing a picture is as follows: The lamp *l* is lighted, and the heating-plate *f* is allowed to remain over it until the burnishing-surface is sufficiently heated. A little practice will enable the operator to perceive when the proper degree of heat is attained. By means of the screws *h h* the burnishing-tool is pressed down close to the bed *b*, and the picture, in a dry state, is inserted between them under the edge of the burnishing-tool, which is drawn over it by means of the lever *j*. The ends of the picture may then be reversed, and the operation repeated. Two strokes each way will usually suffice to give a fine burnish-polish. The pressure exerted by the screws *h h* assists the operation of burnishing, and the concavity of the burnishing-surface together with the convexity of the bed tend to stretch the picture on the card, and obviate any liability to pucker.

What I claim as my invention, and desire to secure by Letters Patent, is—

1. In a machine for burnishing photographs, the combination of the concave burnisher *g* and convex bed *b*, substantially as set forth.

2. In combination with the concave burnisher and convex bed, I claim the standards *c c*, the bar *d*, lever *k*, and pressure-screws *h h*, substantially as described.

3. In a machine for burnishing photographic cards by friction under pressure against a non-rotating burnishing-tool, I claim a broad metal plate, connected with the burnishing-tool, adapted and arranged to receive the flame of a lamp or gas-jet, and conduct the heat thereof to said burnishing-tool, substantially as and for the purpose specified.

4. In a machine for burnishing photographs by means of pressure and friction against a heated non-rotating burnishing-tool, I claim a burnishing-tool made of cast-iron.

5. I also claim the process of burnishing and finishing a photographic picture by subjecting it to friction under pressure against a heated non-rotating burnishing-tool, substantially as herein described.

6. In combination with the bed *b* and the plate *f* connected with the burnishing-tool *g*, I claim the lamp *l*, all being arranged to operate substantially as and for the purpose described.

7. I also claim, as a new article of manufacture, a hot-burnish-finished photograph, substantially as described.

E. R. WESTON.

Witnesses:

FRANK C. WESTON,
J. P. BASS.